(12) United States Patent
Zhang et al.

(10) Patent No.: US 12,270,314 B2
(45) Date of Patent: *Apr. 8, 2025

(54) EXHAUST DEVICE AND INSTALLATION METHOD THEREOF, TURBINE FRACTURING APPARATUS, DISASSEMBLY METHOD OF TURBINE (71) Applicant: YANTAI JEREH PETROLEUM EQUIPMENT & TECHNOLOGIES CO., LTD., Shandong (CN)

(72) Inventors: Peng Zhang, Shandong (CN); Liang Lv, Shandong (CN); Xincheng Li, Shandong (CN); Rikui Zhang, Shandong (CN); Yipeng Wu, Shandong (CN); Chunqiang Lan, Shandong (CN); Weipeng Yuan, Shandong (CN); Xiaolei Ji, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 800 days.

This patent is subject to a terminal disclaimer.

(21) Appl. No.: 17/396,188

(22) Filed: Aug. 6, 2021

(65) Prior Publication Data
US 2022/0316362 A1   Oct. 6, 2022

(30) Foreign Application Priority Data
Mar. 30, 2021   (CN) .......................... 202110339066.3

(51) Int. Cl.
*F01D 25/30* (2006.01)
*E21B 43/26* (2006.01)
(Continued)

(52) U.S. Cl.
CPC .............. *F01D 25/30* (2013.01); *E21B 43/26* (2013.01); *E21B 43/2607* (2020.05);
(Continued)

(58) Field of Classification Search
CPC .......... F01D 25/30; F01D 25/00; F01D 25/18; E21B 43/26; E21B 43/2607; F02C 7/045;
(Continued)

(56) References Cited

U.S. PATENT DOCUMENTS 2,988,153 A   6/1961   Haworth et al.
3,350,138 A   10/1967   Wilms
(Continued)

FOREIGN PATENT DOCUMENTS

CA   2944968      8/2016
CN   2625578 Y    7/2004
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
(Continued)

Primary Examiner — James G Sayre
(74) Attorney, Agent, or Firm — Crowell & Moring LLP (57) ABSTRACT An exhaust device and an installation method thereof, a turbine fracturing apparatus, and a disassembly method of a turbine are provided. The exhaust device includes a body, a fixation plate, a pressure plate, and a diffusion pipe; the body includes a side wall; the fixation plate is configured to be fixed to the side wall; the pressure plate is configured to be able to be pre-fixedly connected and fixedly connected with the fixation plate; the diffusion pipe is configured to be fixed to the side wall through the pressure plate and the fixation plate; the fixation plate further comprises a first pre-installation part, and the pressure plate further comprises a second pre-installation part, and the second pre-installation part is matched with the first pre-installation part to realize pre-fixation of the diffusion pipe.

19 Claims, 6 Drawing Sheets (51) Int. Cl.
*F01N 13/18* (2010.01)
*F02C 7/045* (2006.01)

(52) U.S. Cl.
CPC .............. *F02C 7/045* (2013.01); *F01N 13/18* (2013.01); *F01N 13/1805* (2013.01); *F05D 2230/60* (2013.01); *F05D 2230/70* (2013.01)

(58) Field of Classification Search
CPC ...... F01N 13/18; F01N 13/1805; F01N 13/00; F05D 2230/60; F05D 2230/70; F05D 2260/96
See application file for complete search history.

(56) References Cited

U.S. PATENT DOCUMENTS

| | | | |
|---|---|---|---|
| 3,400,609 | A | 9/1968 | Utter |
| 3,418,485 | A | 12/1968 | Anderson et al. |
| 3,791,682 | A | 2/1974 | Mitchell |
| 3,881,841 | A | 5/1975 | Straniti |
| 4,341,071 | A | 7/1982 | Abo et al. |
| 5,435,975 | A | 7/1995 | Bastos |
| 5,517,822 | A | 5/1996 | Haws et al. |
| 5,709,076 | A | 1/1998 | Lawlor |
| 6,230,481 | B1 | 5/2001 | Jahr |
| 6,446,425 | B1 | 9/2002 | Lawlor |
| 7,028,461 | B2 | 4/2006 | Goi |
| 7,036,318 | B1 | 5/2006 | Munson, Jr. |
| 7,506,574 | B2 | 3/2009 | Jensen et al. |
| 7,552,903 | B2 | 6/2009 | Dunn et al. |
| 7,845,413 | B2 | 12/2010 | Shampine et al. |
| 8,506,267 | B2 | 8/2013 | Gambier |
| 8,567,354 | B2 | 10/2013 | Kealy et al. |
| 8,621,873 | B2 | 1/2014 | Robertson et al. |
| 8,801,394 | B2 | 8/2014 | Anderson |
| 9,534,473 | B2 | 1/2017 | Morris et al. |
| 9,650,879 | B2 | 5/2017 | Broussard |
| 10,030,579 | B2 | 7/2018 | Austin et al. |
| 10,060,293 | B2 | 8/2018 | Del Bono |
| 10,371,012 | B2 | 8/2019 | Davis et al. |
| 10,815,764 | B1 | 10/2020 | Yeung |
| 10,895,202 | B1 | 1/2021 | Yeung et al. |
| 10,954,770 | B1 | 3/2021 | Yeung et al. |
| 10,961,993 | B1 | 3/2021 | Ji et al. |
| 10,968,837 | B1 | 4/2021 | Yeung et al. |
| 11,111,768 | B1 | 9/2021 | Yeung et al. |
| 11,181,046 | B1 | 11/2021 | Brooks et al. |
| 11,242,737 | B2 | 2/2022 | Zhang |
| 11,499,405 | B2 | 11/2022 | Zhang |
| 11,519,395 | B2 | 12/2022 | Zhang |
| 12,065,916 | B2 * | 8/2024 | Zhang .................... F01D 25/30 |
| 2003/0004029 | A1 | 1/2003 | Lagarde et al. |
| 2003/0171184 | A1 | 9/2003 | Wige |
| 2004/0050049 | A1 | 3/2004 | Wendt et al. |
| 2005/0221946 | A1 | 10/2005 | Mitrovic |
| 2007/0213171 | A1 | 9/2007 | Pizzichil et al. |
| 2007/0277982 | A1 | 12/2007 | Shampine et al. |
| 2009/0068031 | A1 | 3/2009 | Gambier et al. |
| 2010/0033148 | A1 | 1/2010 | Deldalle |
| 2010/0071899 | A1 | 3/2010 | Coquilleau et al. |
| 2011/0085924 | A1 | 4/2011 | Shampine et al. |
| 2011/0171044 | A1 | 7/2011 | Flanigan |
| 2013/0112029 | A1 | 5/2013 | Slayter et al. |
| 2013/0209236 | A1 | 8/2013 | Xu |
| 2014/0013768 | A1 | 1/2014 | Laing |
| 2014/0144641 | A1 | 5/2014 | Chandler |
| 2014/0174717 | A1 | 6/2014 | Broussard et al. |
| 2014/0219824 | A1 | 8/2014 | Burnette |
| 2014/0274557 | A1 | 9/2014 | Chong |
| 2014/0322034 | A1 | 10/2014 | Bayyouk |
| 2015/0184591 | A1 | 7/2015 | Giancotti et al. |
| 2015/0247421 | A1 | 9/2015 | Wojick et al. |
| 2015/0252661 | A1 | 9/2015 | Glass |
| 2015/0275891 | A1 | 10/2015 | Chong |
| 2015/0377318 | A1 | 12/2015 | Byrne |
| 2015/0381013 | A1 | 12/2015 | Davies et al. |
| 2016/0047305 | A1 | 2/2016 | Wickert et al. |
| 2016/0102581 | A1 | 4/2016 | Del Bono |
| 2016/0169322 | A1 | 6/2016 | Ono |
| 2016/0177678 | A1 | 6/2016 | Morris et al. |
| 2016/0218650 | A1 | 7/2016 | Gajanayake et al. |
| 2016/0230525 | A1 | 8/2016 | Lestz et al. |
| 2016/0281484 | A1 | 9/2016 | Lestz et al. |
| 2016/0341124 | A1 | 11/2016 | Ross et al. |
| 2016/0348479 | A1 | 12/2016 | Oehring et al. |
| 2017/0023014 | A1 | 1/2017 | Clemen et al. |
| 2017/0082110 | A1 | 3/2017 | Lammers |
| 2017/0089189 | A1 | 3/2017 | Norris et al. |
| 2017/0104389 | A1 | 4/2017 | Morris et al. |
| 2017/0218727 | A1 | 8/2017 | Oehring et al. |
| 2017/0234067 | A1 | 8/2017 | Buckley |
| 2017/0292789 | A1 | 10/2017 | Hjorth et al. |
| 2018/0111807 | A1 | 4/2018 | Snider |
| 2018/0266412 | A1 | 9/2018 | Stokkevag et al. |
| 2018/0283464 | A1 | 10/2018 | Altamura |
| 2019/0063309 | A1 | 2/2019 | Davis |
| 2019/0067991 | A1 | 2/2019 | Davis et al. |
| 2019/0068026 | A1 | 2/2019 | Davis |
| 2019/0178235 | A1 | 6/2019 | Coskrey et al. |
| 2019/0338762 | A1 | 11/2019 | Curry et al. |
| 2020/0040878 | A1 | 2/2020 | Morris et al. |
| 2020/0049136 | A1 | 2/2020 | Stephenson |
| 2020/0056458 | A1 | 2/2020 | Mao et al. |
| 2020/0109616 | A1 | 4/2020 | Oehring et al. |
| 2020/0116038 | A1 | 4/2020 | Saraswathi |
| 2020/0325761 | A1 | 10/2020 | Williams |
| 2020/0332784 | A1 | 10/2020 | Zhang et al. |
| 2020/0340344 | A1 | 10/2020 | Reckels et al. |
| 2020/0370633 | A1 | 11/2020 | Kumar |
| 2020/0392826 | A1 | 12/2020 | Cui et al. |
| 2021/0025383 | A1 | 1/2021 | Bodishbaugh |
| 2021/0079902 | A1 | 3/2021 | Yeung et al. |
| 2021/0102531 | A1 | 4/2021 | Bodishbaugh et al. |
| 2021/0372256 | A1 | 12/2021 | Yeung et al. |
| 2021/0381358 | A1 | 12/2021 | Yeung |
| 2021/0404309 | A1 | 12/2021 | Yeung et al. |
| 2022/0259964 | A1 | 8/2022 | Zhang |
| 2023/0212933 | A1 * | 7/2023 | Zhang .................... F01D 25/30 60/39.5 |

FOREIGN PATENT DOCUMENTS

| | | |
|---|---|---|
| CN | 201159100 Y | 12/2008 |
| CN | 201646518 U | 11/2010 |
| CN | 201863895 U | 6/2011 |
| CN | 102136778 A | 7/2011 |
| CN | 102602323 A | 7/2012 |
| CN | 202673269 U | 1/2013 |
| CN | 202763319 U | 3/2013 |
| CN | 202926404 U | 5/2013 |
| CN | 202935216 U | 5/2013 |
| CN | 203962367 U | 11/2014 |
| CN | 105065224 A | 11/2015 |
| CN | 205117343 U | 3/2016 |
| CN | 105545666 A | 5/2016 |
| CN | 105703535 A | 6/2016 |
| CN | 106089175 A | 11/2016 |
| CN | 107208557 A | 9/2017 |
| CN | 107544304 A | 1/2018 |
| CN | 107939342 A | 4/2018 |
| CN | 208862781 U | 5/2019 |
| CN | 109869294 A | 6/2019 |
| CN | 109882144 A | 6/2019 |
| CN | 109906305 A | 6/2019 |
| CN | 107461253 B | 8/2019 |
| CN | 110118127 A | 8/2019 |
| CN | 110145399 A | 8/2019 |
| CN | 110374745 A | 10/2019 |
| CN | 110469314 A | 11/2019 |
| CN | 110469405 A | 11/2019 |
| CN | 110500255 A | 11/2019 |
| CN | 110513097 A | 11/2019 |
| CN | 209586278 U | 11/2019 |
| CN | 209586287 U | 11/2019 |

(56) References Cited

FOREIGN PATENT DOCUMENTS

| | | |
|---|---|---|
| CN | 110735713 A | 1/2020 |
| CN | 110821464 A | 2/2020 |
| CN | 210714958 U | 6/2020 |
| CN | 210985525 A | 7/2020 |
| CN | 111594314 A | 8/2020 |
| CN | 111946504 A | 11/2020 |
| CN | 112343676 A | 2/2021 |
| CN | 112682172 A | 4/2021 |
| DE | 102015213625 A1 | 1/2017 |
| FR | 2890438 A1 | 3/2013 |
| KR | 101861753 B1 | 5/2018 |
| WO | WO 2019/204323 A1 | 10/2019 |

OTHER PUBLICATIONS

International Search Report, dated Jun. 5, 2020, pp. 1-4, issued in International Patent Application No. PCT/CN2019/107020, China Intellectual Property Administration, Beijing, China.

International Search Report, dated Jun. 5, 2020, pp. 1-4, issued in International Patent Application No. PCT/CN2019/107021, China Intellectual Property Administration, Beijing, China.

International Search Report, dated Jun. 10, 2020, pp. 1-4, issued in International Patent Application No. PCT/CN2019/107023, China Intellectual Property Administration, Beijing, China.

International Search Report, dated May 14, 2020, pp. 1-4, issued in International Patent Application No. PCT/CN2019/107026, China Intellectual Property Administration. Beijing, China.

International Search Report, dated Sep. 26, 2021, pp. 1-4, issued in International Patent Application No. PCT/CN2019/095646, China Intellectual Property Administration, Beijing, China.

Ex parte Quayle Office Action mailed May 14, 2024 for U.S. Appl. No. 18/342,318.

US Office Action, Aug. 20, 2024, pp. 1-7, issued in U.S. Appl. No. 18/509,683, USPTO, Alexandria, Virginia.

* cited by examiner

EXHAUST DEVICE AND INSTALLATION METHOD THEREOF, TURBINE FRACTURING APPARATUS, DISASSEMBLY METHOD OF TURBINE

CROSS REFERENCE TO RELATED APPLICATION

The application claims priority to the Chinese patent application No. 202110339066.3, filed on Mar. 30, 2021, the entire disclosure of which is incorporated herein by reference as part of the present application.

TECHNICAL FIELD

At least one embodiment of the present disclosure relates to an exhaust device and an installation method thereof, a turbine fracturing apparatus, and a disassembly method of a turbine.

BACKGROUND

In recent years, with the increasing demand for unconventional natural gas such as shale gas, the demand for fracturing apparatus has also increased significantly. A fracturing apparatus usually includes a main power device, a plurality of auxiliary power devices and some match devices, such as diffusion pipes, silencers and other functional components, these components are usually arranged horizontally and have large volume, and their assembly process is an important process in forming a turbine fracturing apparatus.

SUMMARY

At least one embodiment of the present disclosure provides an exhaust device, the exhaust device comprises a body, a fixation plate, a pressure plate, and a diffusion pipe; the body comprises a side wall; the fixation plate is configured to be fixed to the side wall; the pressure plate is configured to be pre-fixedly connected and fixedly connected with the fixation plate; the diffusion pipe is configured to be fixed to the side wall through the pressure plate and the fixation plate, the fixation plate further comprises a first pre-installation part, and the pressure plate further comprises a second pre-installation part, and the second pre-installation part is matched with the first pre-installation part to realize pre-fixation of the diffusion pipe.

For example, in the exhaust device provided by at least one embodiment of the present disclosure, the second pre-installation part and the first pre-installation part are configured to realize the pre-fixation of the diffusion pipe by plugging with each other, one of the second pre-installation part and the first pre-installation part comprises a concave part, other one of the second pre-installation part and the first pre-installation part comprises a convex part, the second pre-installation part and the first pre-installation part are plugged with each other, at least a part of the convex part is in the concave part.

For example, in the exhaust device provided by at least one embodiment of the present disclosure, the side wall has an installation opening; the fixation plate has a first opening configured for the diffusion pipe to pass through; the pressure plate has a second opening configured for the diffusion pipe to pass through; and the diffusion pipe is configured to pass through the installation opening, the first opening and the second opening to be fixed on the side wall.

For example, in the exhaust device provided by at least one embodiment of the present disclosure, the fixation plate comprises a first plate surface, the first pre-installation part comprises a first installation part protruding from the first plate surface in an axial direction, and the first installation part at least partially surrounds the first opening, the first pre-installation part further comprises a first baffle protruding from a side of the first installation part to the first opening, and the side of the first installation part faces the first opening; the first baffle is spaced apart from a first surface of the first installation part by a predetermined distance, and the first surface of the first installation part is spaced apart from the first plate surface in the axial direction, so that at least a part of the concave part is defined by the first baffle and the first installation part.

For example, in the exhaust device provided by at least one embodiment of the present disclosure, the first pre-installation part is matched with the second pre-installation part, the first surface of the first installation part faces at least a part of the pressure plate.

For example, in the exhaust device provided by at least one embodiment of the present disclosure, the pressure plate comprises a second plate surface, and the second pre-installation part comprises a first convex part protruding from the second plate surface in the axial direction, and the first convex part at least partially surrounds the second opening; the first pre-installation part is matched with the second pre-installation part, a second surface of the first convex part faces a third surface of the first baffle, the second surface of the first convex part is spaced apart from the second plate surface in the axial direction, and at least a part of the first convex part is in the first pre-installation part, and the third surface serves as at least a part of a bottom surface of the concave part.

For example, the exhaust device provided by at least one embodiment of the present disclosure further comprises a first seal part between the first surface and the pressure plate and/or a second seal part between the second surface and the first baffle.

For example, in the exhaust device provided by at least one embodiment of the present disclosure, the first installation part has at least one threaded hole which extends in a direction parallel to the first plate surface and communicates with the first opening, in a direction perpendicular to the first plate surface, the at least one threaded hole is between the first baffle and the first surface.

For example, in the exhaust device provided by at least one embodiment of the present disclosure, the fixation plate comprises a first plate surface, the first pre-installation part comprises a second installation part protruding from the first plate surface in an axial direction, and the second installation part at least partially surrounds the first opening, a surface of the second installation part spaced apart from the first plate surface in the axial direction comprises a groove extending toward the first plate surface in a direction perpendicular to the first plate surface, and the groove is configured to accommodate at least a part of the convex part.

For example, in the exhaust device provided by at least one embodiment of the present disclosure, the pressure plate comprises a second plate surface, and the second pre-installation part comprises a second convex part protruding from the second plate surface in the axial direction, the second convex part at least partially surrounds the second opening, and the second convex part is configured to be insertable into the groove so that at least a part of the second convex part is in the groove of the second installation part.

For example, in the exhaust device provided by at least one embodiment of the present disclosure, a first side wall of the second installation part, away from the first opening in a radial direction, has at least one threaded hole which extends in a direction parallel to the second plate surface and penetrates through the first side wall.

For example, in the exhaust device provided by at least one embodiment of the present disclosure, the fixation plate comprises a first plate surface, the first pre-installation part comprises a third installation part protruding from the first plate surface in an axial direction, the third installation part at least partially surrounds the first opening, and the third installation part constitutes the convex part; the pressure plate comprises a second plate surface, and the second pre-installation part comprises a third convex part protruding from the second plate surface in the axial direction, the third convex part at least partially surrounds the second opening, and a part of the concave part is defined by the third convex part; the first pre-installation part is matched with the second pre-installation part, at least a part of the third installation part is inserted into the second pre-installation part.

For example, in the exhaust device provided by at least one embodiment of the present disclosure, the third installation part is a first closed annular structure surrounding the first opening, and the third convex part is a second closed annular structure surrounding the second opening, the first pre-installation part is matched with the second pre-installation part, the second closed annular structure is radially outward of the first closed annular structure and is radially outermost of the pressure plate, a side surface of the concave part is constituted by a radial inner surface of the third convex part, and a bottom surface of the concave part is the second plate surface.

For example, in the exhaust device provided by at least one embodiment of the present disclosure, the third convex part has at least one threaded hole which extends in a direction parallel to the second plate surface and penetrates through the third convex part.

At least one embodiment of the present disclosure further provides a turbine fracturing apparatus, the turbine fracturing apparatus comprises a silencer cabin and the exhaust device provided by any embodiment of the present disclosure, a turbine is provided in the silencer cabin, a silencer is provided outside the silencer cabin, the silencer cabin has a side wall, the diffusion pipe is stalled on the side wall, and two ends of the diffusion pipe are respectively connected with the turbine and the silencer.

At least one embodiment of the present disclosure further provides an installation method of the exhaust device provided by at least one embodiment of the present disclosure, the method comprises: fixing the fixation plate to the side wall; matching the second pre-installation part with the first pre-installation part to realize pre-fixation of the diffusion pipe; and fixedly connecting the pressure plate with the fixation plate to fix the diffusion pipe on the side wall.

For example, in the installation method provided by at least one embodiment of the present disclosure, the second pre-installation part and the first pre-installation part are configured to realize the pre-fixation of the diffusion pipe by plugging with each other, one of the second pre-installation part and the first pre-installation part comprises a concave part, other one of the second pre-installation part and the first pre-installation part comprises a convex part, at least a part of the convex part is in the concave part, the installation method further comprises: inserting at least a part of the convex part into the concave part to realize the pre-fixation of the diffusion pipe.

At least one embodiment of the present disclosure further provides a disassembly method of a turbine on a turbine fracturing apparatus, the turbine fracturing apparatus comprises a silencer cabin, an air inlet assembly, a transmission mechanism and the exhaust device provided by any embodiment of the present disclosure; a turbine, a deceleration mechanism and a deceleration mechanism base are provided in the silencer cabin, the diffusion pipe, the turbine, the deceleration mechanism and the transmission mechanism are sequentially connected along an axial direction of the diffusion pipe, the deceleration mechanism base is connected with the deceleration mechanism and detachably fixed on a wall surface of the silencer cabin close to ground, the silencer cabin comprises the side wall, the diffusion pipe is on the side wall, and the air inlet assembly and the diffusion pipe are respectively on two side walls opposite to each other of the silencer cabin; in a case that the air inlet assembly does not need to be dismantled, the disassembly method comprises: disconnecting the connection between the deceleration mechanism and the transmission mechanism, and disconnecting the connection between the diffusion pipe and the turbine and the connection between the diffusion pipe and the side wall; moving the diffusion pipe away from the turbine by a first distance, and moving a whole composed of the turbine, the deceleration mechanism and the deceleration mechanism base towards the diffusion pipe by a second distance, so that the deceleration mechanism avoids the air inlet assembly in a direction perpendicular to the axial direction of the diffusion pipe, wherein the first distance is greater than or equal to the second distance; and moving the whole composed of the turbine, the deceleration mechanism and the deceleration mechanism base out of the silencer cabin along the direction perpendicular to the axial direction of the diffusion pipe.

For example, in the disassembly method of the turbine provided by at least one embodiment of the present disclosure, in a case that the air inlet assembly needs to be dismantled, the disassembly method comprises: dismantling the air inlet assembly from the silencer cabin; disconnecting the connection between the deceleration mechanism and the transmission mechanism, and disconnecting the connection between the diffusion pipe and the turbine and the connection between the diffusion pipe and the side wall; and moving the whole composed of the turbine, the deceleration mechanism and the deceleration mechanism base out of the silencer cabin along the direction perpendicular to the axial direction of the diffusion pipe.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

As mentioned above, a fracturing apparatus usually includes a main power device, a plurality of auxiliary power devices and some match devices, such as diffusion pipes, silencers and other functional components, so as to realize functions such as exhaust, silencing and so on. In an assembly process, these components of the fracturing apparatus are usually arranged transversely and have large volume and weight, which leads to assembly difficulties and labor consumption.

Figure 1:
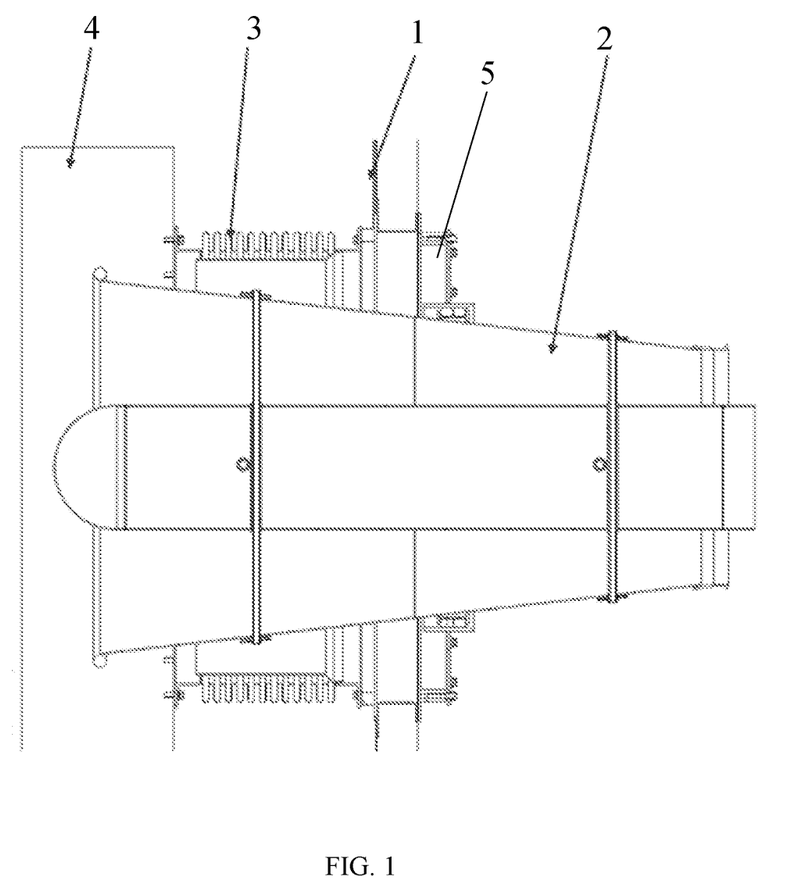
FIG. 1 is a schematic diagram of a diffusion device.

FIG. 1 shows a schematic diagram of a diffusion pipe and a silencer in a fracturing apparatus. As illustrated in FIG. 1, the fracturing apparatus has a cabin side wall 1, and a diffusion pipe 2 is arranged on the cabin side wall 1. One end of the diffusion pipe 2 passes through a corrugated pipe 3 and communicates with a silencer 4, and the other end of the diffusion pipe 2 communicates with a turbine (not illustrated in the figure). In the process of installing the diffusion pipe 2 to the cabin side wall 1, because the diffusion pipe 2 is heavy and bulky, and seal connection between the diffusion pipe 2 and the cabin side wall 1 is soft, it is very difficult to adjust the diffusion pipe 2 to be coaxial with the turbine and fix the diffusion pipe 2 to the cabin side wall 1, which often requires many people to assist in the installation process. For example, after adjusting the diffusion pipe 2 to be coaxial with the turbine, it is necessary to fix the fixation plate 5 of the diffusion pipe 2 on the cabin side wall 1 by welding or bolting, so as to complete the assembly of the diffusion pipe 2, this assembly process is difficult, costs manpower and wastes time.

At least one embodiment of the present disclosure provides an exhaust device, the exhaust device includes a body, a fixation plate, a pressure plate, and a diffusion pipe; the body includes a side wall; the fixation plate is configured to be fixed to the side wall; the pressure plate is configured to be able to be pre-fixedly connected and fixedly connected with the fixation plate; the diffusion pipe is configured to be fixed to the side wall through the pressure plate and the fixation plate; the fixation plate further includes a first pre-installation part, and the pressure plate further includes a second pre-installation part, and the second pre-installation part is matched with the first pre-installation part to realize pre-fixation of the diffusion pipe. In an assembly process of the exhaust device, the first pre-installation part of the fixation plate and the second pre-installation part of the pressure plate can realize pre-fixation of the diffusion pipe by matching with each other, and then the diffusion pipe can be fixed, so that initial alignment between the diffusion pipe and other components (such as turbines) can be realized by the pre-fixation, and then the diffusion pipe can be accurately connected by fixing. This process introduces the pre-fixation, so in the subsequent alignment and fixing process, no manpower is needed to support the diffusion pipe, and no manpower is needed to align the diffusion pipe. Therefore, although the pre-fixation process is added, in fact, the assembly process is simplified, manpower and time are saved, and the assembly efficiency is improved.

The exhaust device and an installation method thereof and a turbine fracturing apparatus provided by embodiments of the present disclosure are described in detail below by several specific examples.

Figure 2:
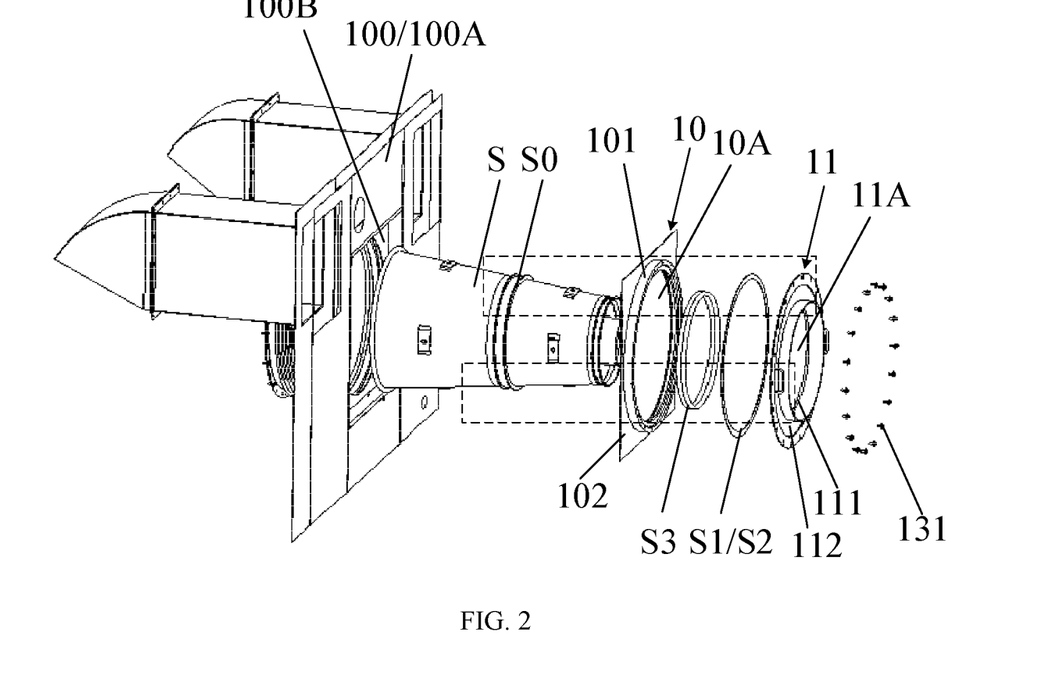
FIG. 2 is an exploded diagram of a diffusion device provided by at least one embodiment of the present disclosure.

At least one embodiment of the present disclosure provides an exhaust device, and FIG. 2 shows an exploded diagram of the exhaust device. As illustrated in FIG. 2, the exhaust device includes a body 100, a fixation plate 10, a pressure plate 11 and a diffusion pipe S; the body 100 includes a side wall 100A; the fixation plate 10 is configured to be fixed to the side wall 100A; the pressure plate 11 is configured to be pre-fixedly connected and fixedly connected with the fixation plate 10; the diffusion pipe S is configured to be fixed to the side wall 100A by the pressure plate 11 and the fixation plate 10.

For example, in the embodiments of the present disclosure, the body 100, the fixation plate 10, the pressure plate 11 and the diffusion pipe S may be in a state to be assembled or in an assembled state.

Figure 3:
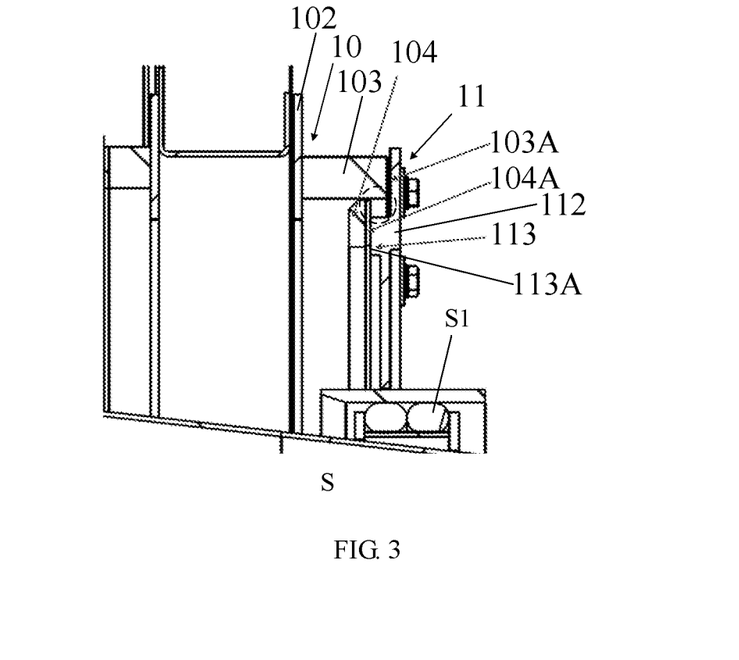
FIG. 3 is an enlarged schematic diagram of a part of the diffusion device in FIG. 2 after assembly of the diffusion device.

For example, FIG. 3 shows a schematic cross-sectional diagram of a part of the exhaust device in FIG. 2 in the upper dashed frame region after assembly of the exhaust device. As illustrated in FIG. 2 and FIG. 3, the fixation plate 10 further includes a first pre-installation part 101, and the pressure plate 11 further includes a second pre-installation part 111, and the second pre-installation part 111 and the first pre-installation part 101 may be matched with each other to realize pre-fixation of the diffusion pipe S. For example, the match and cooperation between the second pre-installation part 111 and the first pre-installation part 101 may include match connection such as plugging connection, lap joint connection, clamping connection, and so on, and the embodiments of the present disclosure do not specifically limit the match mode between the second pre-installation part 111 and the first pre-installation part 101.

For example, in some embodiments, the second pre-installation part 111 and the first pre-installation part 101 are configured to realize the pre-fixation of the diffusion pipe S by plugging with each other. For example, one of the second pre-installation part 111 and the first pre-installation part 101 includes a concave part, and the other one of the second pre-installation part 111 and the first pre-installation part 101 includes a convex part. In a case that the second pre-installation part 111 and the first pre-installation part 111 are plugged with each other, at least a part of the convex part is located in the concave part, thereby realizing the pre-fixation of the diffusion pipe S.

For example, as illustrated in FIG. 2, the side wall 100A has an installation opening 100B, the fixation plate 10 has a first opening 10A configured for the diffusion pipe S to pass through, and the pressure plate 11 has a second opening 11A configured for the diffusion pipe S to pass through; the diffusion pipe S is configured to pass through the installation opening 100B, the first opening 10A and the second opening 11A to be fixed on the side wall 100A. For example, a middle portion S0 of the diffusion pipe S0 is configured as a portion fixed to the side wall 100A.

For example, in some embodiments, as illustrated in FIG. 2 and FIG. 3, the fixation plate 10 may include a first plate surface 102, and the first pre-installation part 101 includes a first installation part 103 protruding from the first plate surface 102 in an axial direction (i.e., the horizontal direction in the figure), and the first installation part 103 at least partially surrounds the first opening 10A. As illustrated in FIG. 3, the first pre-installation part 10 further includes a first baffle 104 protruding from a side of the first installation part 103 to the first opening 10A, the side of the first installation part 10 faces the first opening 10A, and the first baffle 104 is spaced apart from a first surface 103A of the first installation part 103 by a predetermined distance, and the first surface 103A of the first installation part 103 is spaced apart from the first plate surface 102 in the axial direction, so that the first pre-installation part 101 is configured as the concave part for plugging connection, and at least a part of the concave part is defined by the first baffle 104 and the first installation part 103, that is, the part illustrated in the dash circle in FIG. 3.

For example, in the case that the first pre-installation part 101 is matched with the second pre-installation part 111, the first surface 103A of the first installation part 103 faces at least a part of the pressure plate 11. For example, a seal ring may be provided between the first surface 103A and the pressure plate 11 for sealing the fixation plate 10 and the pressure plate 11.

For example, in some embodiments, as illustrated in FIG. 2 and FIG. 3, the pressure plate 11 may include a second plate surface 112, and the second pre-installation part 111 includes a first convex part 113 protruding from the second plate surface 112 in the axial direction (i.e., the horizontal direction in the figure), and the first convex part 113 at least partially surrounds the second opening 11A. In the case that the first pre-installation part 101 is matched with the second pre-installation part 111, a second surface 113A of the first convex part 113 faces a third surface 104A of the first baffle 104, the second surface 113A is spaced apart from the second plate surface 112 in the axial direction. For example, a seal ring may be provided between the second surface 113A and the third surface 104A of the first baffle 104 for sealing the fixation plate 10 and the pressure plate 11.

For example, in the case that the first pre-installation part 101 is matched with the second pre-installation part 111, as illustrated in FIG. 3, at least a part of the first convex part 113 is located in the concave part defined by the first baffle 104 and the first installation part 103, and in this case, the third surface 104A of the first baffle 104 serves as at least a part of a bottom surface of the concave part.

For example, in some embodiments, the first installation part 103 is a first closed annular structure surrounding the first opening 10A, and the first convex part 113 is a second closed annular structure surrounding the second opening 11A. In the case that the first pre-installation part is matched with the second pre-installation part, the second closed annular structure is located radially inside the first closed annular structure, that is, in this embodiment, the first pre-installation part 101 includes a concave part defined by the first baffle 104 and the first installation part 103, and the second pre-installation part 111 includes a convex part defined by the first convex part 113. In the case that the first pre-installation part is matched with the second pre-installation part, at least a part of the second pre-installation part 111 (e.g., the convex part defined by the first convex part 113) is inserted into the first pre-installation part (e.g., the concave part defined by the first baffle 104 and the first installation part 103), so as to realize the plugging connection, thereby realizing the pre-fixation of the diffusion pipe.

For example, in some embodiments, as illustrated in FIG. 2 and FIG. 3, the exhaust device may further include a first seal part S1 between the first surface 103A and the pressure plate 11 and/or a second seal part S2 between the second surface 113A and the first baffle 104, so as to seal the fixation plate 10 and the pressure plate 11. For example, in specific implementation, the exhaust device may include only the first seal part S1 between the first surface 103A and the pressure plate 11, or include only the second seal part S2 between the second surface 113A and the first baffle 104, or include both the first seal part S1 and the second seal part S2, the embodiments of the present disclosure are not limited in this aspect.

For example, as illustrated in FIG. 2 and FIG. 3, the exhaust device may further include a third seal part S3, the third seal part S3 may be disposed between the fixation plate 10 and the diffusion pipe S for sealing the fixation plate 10 and the diffusion pipe S.

Figure 4:
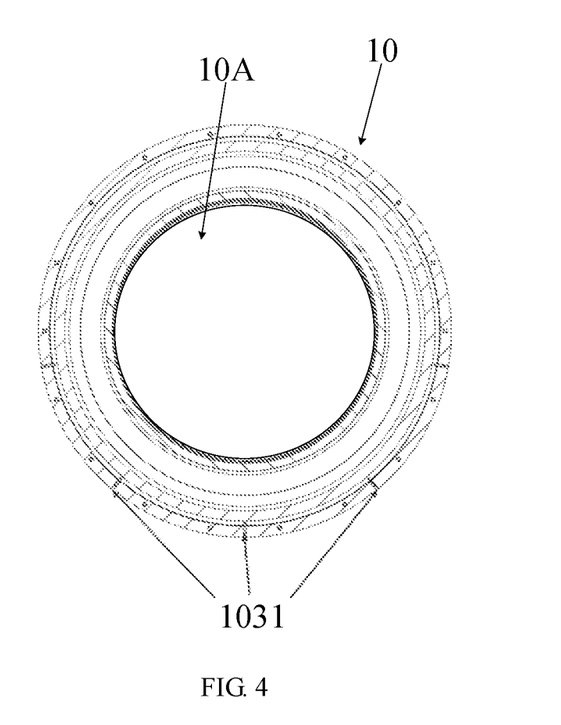
FIG. 4 is a schematic planar diagram of a fixation plate of the diffusion device provided by at least one embodiment of the present disclosure.
Figure 5:
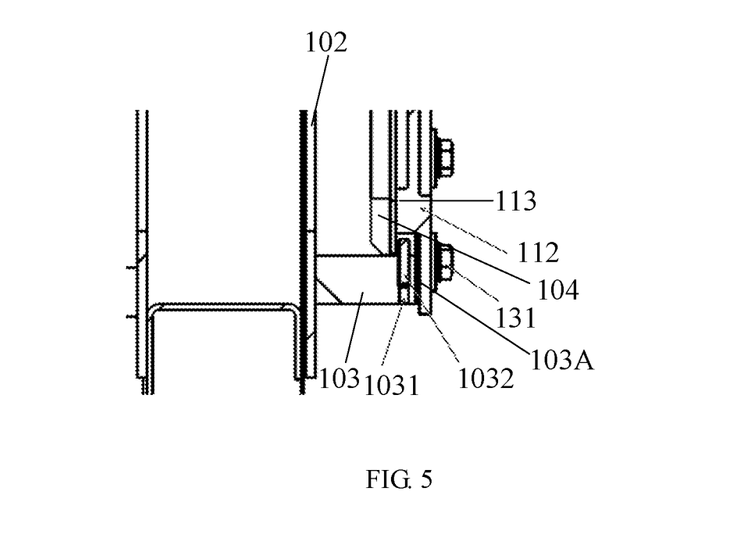
FIG. 5 is an enlarged schematic diagram of another part of the diffusion device in FIG. 2 after assembly of the diffusion device.

For example, FIG. 4 shows a schematic planar diagram of the fixation plate, and FIG. 5 shows a schematic cross-sectional diagram of a part of the exhaust device in FIG. 2 in the lower dashed frame region after assembly of the diffusion device. For example, in some embodiments, the first installation part 103 has at least one threaded hole 1031 which extends in a direction parallel to the first plate surface 102 (the vertical direction in FIG. 5) and communicates with the first opening 10A, and the at least one threaded hole 1031 is located between the first baffle 104 and the first surface 103A of the first installation part 103 in a direction perpendicular to the first plate surface 102 (the horizontal direction in FIG. 5), as illustrated in FIG. 5.

For example, a top thread 1032 can be screwed into the at least one threaded hole 1031. In this case, the top thread 1032 can abut against the first convex part 113 on the pressure plate 11, so as to realize fine adjustment of the position of the pressure plate 11, and further to realize fine adjustment of the diffusion pipe S.

For example, as illustrated in FIG. 4, the at least one threaded hole 1031 include a plurality of threaded holes 1031, and the plurality of threaded holes 1031 may surround the first opening 10A. For example, in some examples, the plurality of threaded holes 1031 may surround the first opening 10A in a circle shape; or, the plurality of threaded holes 1031 may surround the first opening 10A in a half of a circle shape at a lower side of the first opening 10A (the case illustrated in FIG. 4). Because at the lower side of the first opening 10A, the fixation plate 10 bears the weight of the diffusion pipe S, fine adjustment of the position of the diffusion pipe S can be achieved at least in the direction of gravity by setting the threaded hole 1031 and the top thread 1032 at the lower side of the first opening 10A, thereby achieving the effect of accurately installing the diffusion pipe S.

In the assembling process of the exhaust device provided by the embodiments of the present disclosure, the first pre-installation part 101 of the fixation plate 10 and the second pre-installation part 111 of the pressure plate 11 can pre-fix the diffusion pipe S by cooperating with (or matching with) each other, so as to realize the initial alignment of the diffusion pipe S with other components (such as the turbine), and then the diffusion pipe S is fixed, for example, the fixation plate 10 and the pressure plate 11 are fixedly connected by a bolt 131, as illustrated in FIG. 2 and FIG. 5. Therefore, the diffusion pipe can be accurately connected by pre-fixation and then fixing. This process can simplify the assembly process, save manpower and time, and improve the assembly efficiency. Furthermore, it is also possible to adjust the position of the diffusion pipe S by the top thread, and then fix the diffusion pipe after adjusting the diffusion pipe to an appropriate position, thereby improving the assembly efficiency and assembly accuracy.

For example, in some embodiment, the first pre-installation part 101 on the fixation plate 10 and the second pre-installation part 111 on the pressure plate 11 may also adopt different structures from the above embodiments.

Figure 6:
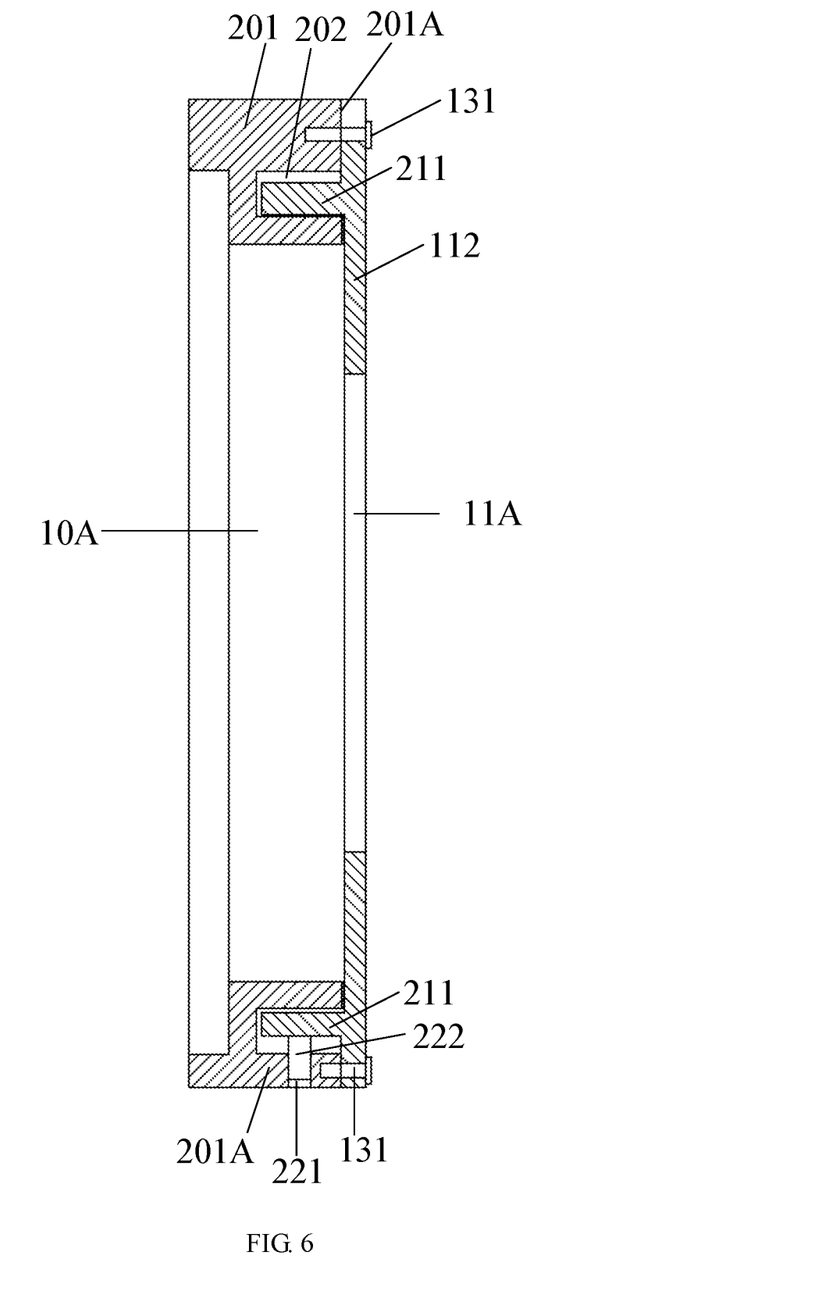
FIG. 6 is a schematic cross-sectional diagram of a first pre-installation part of a fixation plate and a second pre-installation part of a pressure plate in a match state in a diffusion device provided by at least one embodiment of the present disclosure.

For example, FIG. 6 shows another schematic cross-sectional diagram of the cooperation between the first pre-installation part and the second pre-installation part provided by at least one embodiment of the present disclosure. Referring to FIG. 2 and FIG. 6, in this embodiment, the fixation plate 10 includes a first plate surface 102, the first pre-installation part 101 includes a second installation part 201 protruding from the first plate surface 102 in the axial direction, and the second installation part 201 at least partially surrounds the first opening 10A, a surface 201A of the second installation part 201 includes a groove 202 extending toward the first plate surface 102 in a direction perpendicular to the first plate surface 102 (the horizontal direction in the figure), the surface 201A is spaced apart from the first plate surface 102 in the axial direction, and the groove 202 is configured to accommodate at least a part of a convex part (for example, the second convex part 211 described later).

For example, with reference to FIG. 2 and FIG. 6, the pressure plate 11 includes a second plate surface 112, and the second pre-installation part 111 includes a second convex part 211 protruding from the second plate surface 112 in an axial direction, and the second convex part 211 at least partially surrounds the second opening 11A and is configured to be insertable into the groove 202, so that at least a part of the second convex part 211 can be located in the groove 202 of the second installation part 201 to realize the plugging connection of the first pre-installation part and the second pre-installation part.

For example, in some embodiments, the second installation part 201 is a first closed annular structure surrounding the first opening 10A, and the second convex part 211 is a second closed annular structure surrounding the second opening 11A. In this embodiment, the first pre-installation part 101 includes a concave part defined by the groove 202 of the second installation part 201, and the second pre-installation part 111 includes a convex part defined by the second convex part 211. In the case that the first pre-installation part is matched with the second pre-installation part, at least a part of the second pre-installation part 111 (e.g., the second convex part 211) is inserted into the first pre-installation part (e.g., the groove 202 of the second installation part 201), so as to realize the plugging connection and further realize the pre-fixation of the diffusion pipe.

For example, as illustrated in FIG. 6, the first side wall 201A of the second installation part 201, which is away from the first opening 10A in the radial direction (the vertical direction in the figure), has at least one threaded hole 221 which extends in the direction parallel to the second plate surface 111 (the vertical direction in the figure) and penetrates through the first side wall 201A.

For example, a top thread 222 can be screwed into the at least one threaded hole 221, and the top thread 222 can abut against the second convex part 211 on the pressure plate 11, so as to realize fine adjustment of the position of the pressure plate 11 and further to realize fine adjustment of the diffusion pipe S.

For example, similar to the case illustrated in FIG. 4, the at least one threaded hole 221 may include a plurality of threaded holes 221, and the plurality of threaded holes 221 may surrounds the first opening 10A. For example, in some examples, the plurality of threaded holes 221 may surround the first opening 10A in a circle shape; or, the plurality of threaded holes 1031 may surround the first opening 10A in a half of a circle shape at a lower side of the first opening 10A. Because at the lower side of the first opening 10A, the fixation plate 10 bears the weight of the diffusion pipe S, fine adjustment of the position of the diffusion pipe S can be achieved at least in the direction of gravity by arranging the threaded hole 221 and the top thread 222 at a lower side of the first opening 10A, thereby achieving the effect of accurately installing the diffusion pipe S.

Similarly, in the assembling process of the exhaust device provided by the embodiments of the present disclosure, the first pre-installation part 101 of the fixation plate 10 and the second pre-installation part 111 of the pressure plate 11 can pre-fix the diffusion pipe S by cooperating with (matching with) each other, so as to realize the initial alignment between the diffusion pipe S and other components (such as the turbine), and then the diffusion pipe S can be fixed, for example, the fixation plate 10 and the pressure plate 11 are fixedly connected by the bolt 131, as illustrated in FIG. 2 and FIG. 6, and in this way, the diffusion pipe can be accurately connected by pre-fixation and then fixing, which can simplify the assembly process, save manpower and time, and improve assembly efficiency.

Figure 7:
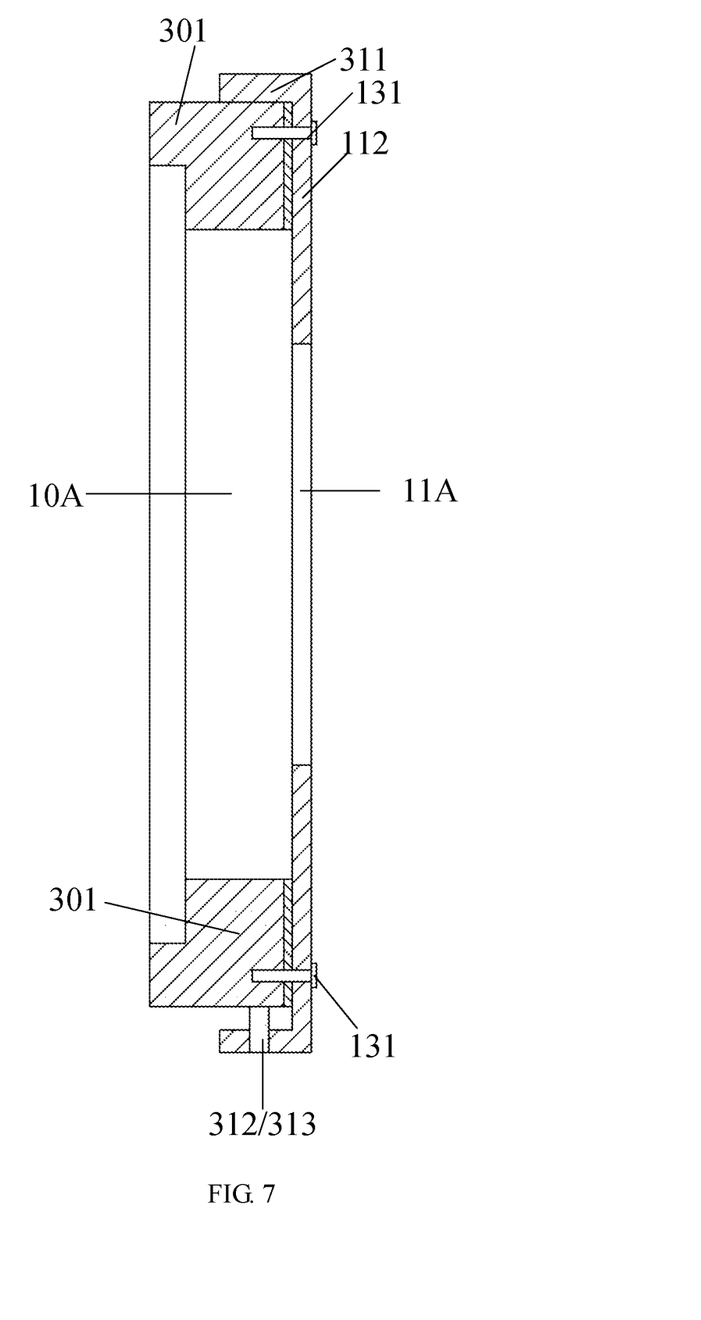
FIG. 7 is another schematic cross-sectional diagram of a first pre-installation part of a fixation plate and a second pre-installation part of a pressure plate in a match state in a diffusion device provided by at least one embodiment of the present disclosure.

For example, FIG. 7 shows another schematic cross-sectional diagram of the cooperation between the first pre-installation part and the second pre-installation part provided by at least one embodiment of the present disclosure.

Referring to FIG. 2 and FIG. 7, in this embodiment, the fixation plate 10 includes a first plate surface 102, and the first pre-installation part 101 includes a third installation part 301 protruding from the first plate surface 102 in the axial direction (the horizontal direction in the figure), the third installation part 301 at least partially surrounds the first opening 10A and constitutes a convex part.

For example, the pressure plate 11 includes a second plate surface 112, and the second pre-installation part includes a third convex part 311 protruding from the second plate surface 112 in the axial direction (the horizontal direction in the figure), and the third convex part 311 at least partially surrounds the second opening 11A. In this embodiment, the concave part is defined by the third convex part 311. For example, in the case that the first pre-installation part 101 is matched with the second pre-installation part 111, at least a part of the third installation part 301 is inserted into the second pre-installation part which is the concave part defined by the third convex part 311 and the second plate surface 111, as illustrated in FIG. 7.

For example, in some embodiments, the third installation part 301 is a first closed annular structure around the first opening 10A, and the third convex part 311 is a second closed annular structure around the second opening 11A. In the case that the first pre-installation part is matched with the second pre-installation part, the second closed annular structure is located radially outward of the first closed annular structure and radially outermost of the pressure plate 11, the side surface of the concave part is constituted by the radially inner surface of the third convex part 311, and the bottom surface of the concave part is the second plate surface 111.

For example, in some embodiments, as illustrated in FIG. 7, the third convex part 311 has at least one threaded hole 312 which extends in the direction parallel to the second plate surface 111 (the vertical direction in the figure) and penetrates through the third convex part 311.

For example, a top thread 313 can be screwed into the at least one threaded hole 312, and the top thread 313 can abut against the third installation part 301, so that the position of the fixation plate 10 can be finely adjusted, and thus the diffusion pipe S can be finely adjusted.

For example, similar to the case illustrated in FIG. 4, the at least one threaded hole 312 may include a plurality of threaded holes 312, and the plurality of threaded holes 312 may surround the first opening 10A. For example, in some examples, the plurality of threaded holes 312 may surround the first opening 10A in a circle shape; or, the plurality of threaded holes 312 may surround the first opening 10A in a half of a circle shape at a lower side of the first opening 10A. Because at the lower side of the first opening 10A, the fixation plate 10 bears the weight of the diffusion pipe S, fine adjustment of the position of the diffusion pipe S can be achieved at least in the direction of gravity by setting the threaded hole 312 and the top thread 313 at the lower side of the first opening 10A, thereby achieving the effect of accurately installing the diffusion pipe S.

Similarly, in the assembling process of the exhaust device provided by the embodiment of the present disclosure, the first pre-installation part 101 of the fixation plate 10 and the second pre-installation part 111 of the pressure plate 11 can pre-fix the diffusion pipe S by cooperating with (matching with) each other, so as to realize the initial alignment between the diffusion pipe S and other components (such as the turbine), and then the diffusion pipe S can be fixed, for example, the fixation plate 10 and the pressure plate 11 are fixedly connected by the bolt 131, as illustrated in FIG. 2 and FIG. 7, and in this way, the diffusion pipe can be accurately connected by pre-fixation and then fixing, which can simplify the assembly process, save manpower and time, and improve assembly efficiency.

Figure 8:
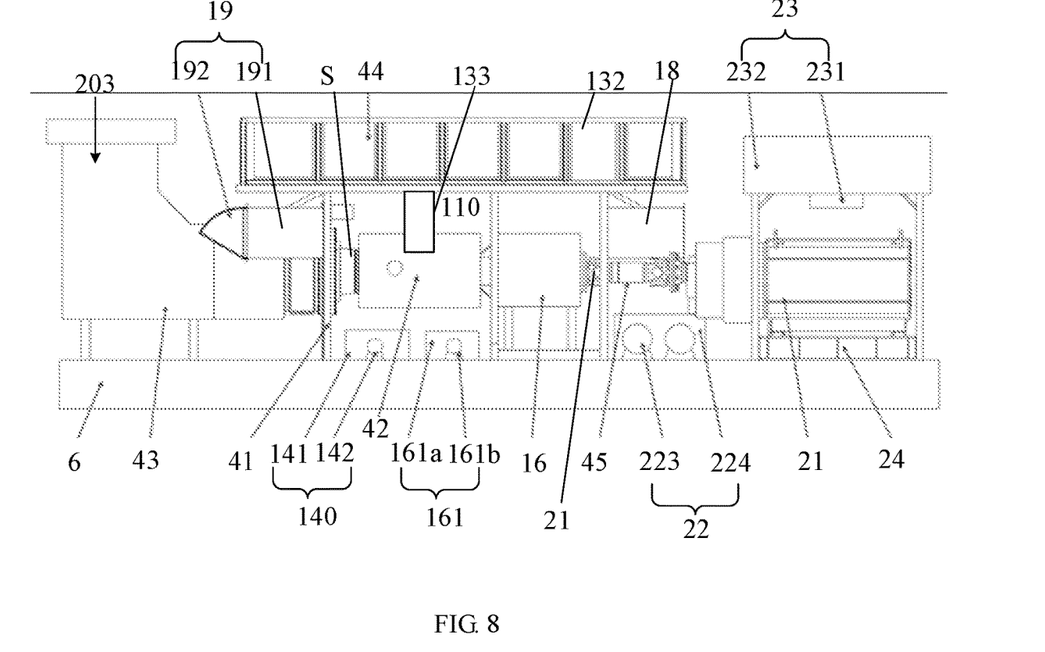
FIG. 8 is a schematic diagram of a turbine fracturing apparatus provided by at least one embodiment of the present disclosure.

At least one embodiment of the present disclosure further provides a turbine fracturing apparatus, and FIG. 8 shows a schematic diagram of the turbine fracturing apparatus. As illustrated in FIG. 8, the turbine fracturing apparatus includes a silencer cabin 41 and the exhaust device provided by the embodiments of the present disclosure. For example, a turbine 42 is disposed in the silencer cabin 41, for example, the silencer cabin 41 has an accommodation space 110, and the turbine 42 is disposed in the accommodation space 110. For example, a silencer 43 is disposed outside the silencer cabin 41, and the silencer cabin 41 has a side wall (i.e., the position indicated by the sign 41), the diffusion pipe S is installed on the side wall, two ends of the diffusion pipe S are respectively connected with the turbine 42 and the silencer 43, and the silencer 43 is configured to silence and guide the exhaust gas discharged by the turbine 42 through the diffusion pipe S to the atmosphere.

For example, in some embodiments, as illustrated in FIG. 8, the silencer 43 includes an L-shaped gas transmission channel 203, one end of the gas transmission channel 203 has an air inlet opening, the air inlet opening communicates with the turbine 42 through the diffusion pipe S for intaking air, and the other end of the gas transmission channel 203 has an upward air outlet opening for discharging the exhaust gas generated by the turbine 42 to the atmosphere.

For example, as illustrated in FIG. 8, the turbine fracturing apparatus may further include an air inlet device 44 and a clean device 140. For example, the turbine 42 and the clean device 140 are located in the accommodation space 110. For example, the air inlet device 44 is on a top of the silencer cabin 41, communicates with the turbine 42 through an air inlet pipe 133, and is configured to provide combustion-support gas to the turbine 42. For example, the air inlet device 44 includes a plurality of air inlet chambers 132 arranged side by side. For example, the air inlet device 44 is fixed on the top of the silencer cabin 41 by welding. For example, the clean device 140 is on a side of the turbine 42 away from the air inlet device 44, that is, below the turbine 42. For example, the clean device 140 includes a water tank 141 and a clean pump 142.

For example, as illustrated in FIG. 8, the turbine fracturing apparatus may further include a deceleration mechanism 16 and a lubrication system 161 that are located in the silencer cabin 41. The lubrication system 161 is configured to lubricate the deceleration mechanism 16. The deceleration mechanism 16 is connected to an output shaft of the turbine 42 and arranged in the axial direction with the turbine 42. For example, the lubrication system 161 includes a lubrication oil tank 161a and a driver mechanism 161b, the driver mechanism includes an electrical motor, that is, the lubrication system 161 is driven by electric power, so it can have a small volume.

For example, as illustrated in FIG. 8, the turbine fracturing apparatus may further include an air inlet assembly 18 and an air outlet assembly 19. The air inlet assembly 18 and the air outlet assembly 19 are configured to create circulation environment in the silencer cabin, which is beneficial to heat dissipation in the cabin. For example, the air outlet assembly 19 includes an air outlet pipe 191 and a lead-out part 192 connected with the air outlet pipe 191, and the lead-out part 192 is configured to change the direction of an air outlet opening of the air outlet assembly, so as to effectively reduce the damage to materials in the cabin caused by sand entering the silencer cabin from the air outlet assembly.

For example, as illustrated in FIG. 8, the turbine fracturing apparatus may further include a transmission mechanism 45, a fracturing pump 21 and a lubrication system 22 configured to lubricate the fracturing pump 21. The lubrication system 22 includes an electrical motor 223 and is located on a side of the transmission mechanism 45 away from the air inlet device 44. The lubrication system 22 further includes a lubrication oil tank 224.

For example, as illustrated in FIG. 8, the turbine fracturing apparatus may further include a lubrication oil heat dissipation device 23 configured to dissipate heat from the lubrication system 22. For example, the lubrication oil dissipation device 23 includes an electrical motor 231 and a dissipation device 232.

For example, as illustrated in FIG. 8, the turbine fracturing apparatus may further include a fracturing pump base 24 located below the fracturing pump 21, the fracturing pump base 24 is configured to raise the fracturing pump 21 to a higher position so that the fracturing pump 21 and the turbine 42 are arranged linearly along the axial direction of the turbine 42, thereby improving the transmission efficiency.

For example, as illustrated in FIG. 8, the turbine fracturing apparatus may further include a bottom skid 6, the above-mentioned components are mounted on the bottom skid 6 for fixing.

For example, the turbine fracturing apparatus may further include other necessary structures, and the specific structures of the turbine fracturing apparatus are not limited in the embodiments of the present disclosure.

The diffusion device of the turbine fracturing apparatus provided by the embodiments of the present disclosure can be assembled in a simple and easy assembly mode, the specific assembly mode can be referred to the above embodiments, and is not described again. Therefore, the assembly efficiency of the turbine fracturing apparatus can be improved, and manpower and time can be saved.

At least one embodiment of the present disclosure further provides an installation method of the exhaust device, and the installation method includes: fixing the fixation plate to the side wall; matching the second pre-installation part with the first pre-installation part to realize pre-fixation of the diffusion pipe; and fixedly connecting the pressure plate with the fixation plate to fix the diffusion pipe on the side wall.

For example, in some embodiments, referring to FIG. 2, in the installation process, the fixation plate 10 may be fixed to the side wall 100A first, and then the diffusion pipe S is allowed to pass through the first opening 10A of the fixation plate 10 and then the diffusion pipe S is allowed to pass the second opening 11A of the pressure plate 11, and then the second pre-installation part 111 of the pressure plate 11 is matched with the first pre-installation part 101 of the fixation plate 10 to realize pre-fixation of the diffusion pipe S; or, in other embodiments, the diffusion pipe S is first allowed to pass through the first opening 10A of the fixation plate 10 and the second opening 11A of the pressure plate 11, then the fixation plate 10 is fixed to the side wall 100A, and then the second pre-installation part 111 of the pressure plate 11 is matched with the first pre-installation part 101 of the fixation plate 10, to realize the pre-fixation of the diffusion pipe S. The embodiments of the present disclosure do not specifically limit the matching sequence of the diffusion pipe S with the fixation plate 10 and the pressure plate 11.

For example, the fixation plate 10 may be fixed to the side wall 100A by bolt connection or the like. The second pre-installation part 111 of the pressure plate 11 and the first pre-installation part 101 of the fixation plate 10 may adopt a match connection such as plugging connection, lap joint connection, clamping connection, and so on, to realize the pre-fixation of the diffusion pipe S.

For example, after the pre-fixation is completed, the fixation plate 10 and the pressure plate 11 may be fixed by fixing means such as bolt connection, thereby fixing the diffusion pipe S on the side wall 100A.

For example, in some embodiments, as described in the above embodiments, the second pre-installation part 111 and the first pre-installation part 101 may be configured to pre-fix the diffusion pipe S by plugging connection. In this case, one of the second pre-installation part 111 and the first pre-installation part 101 includes a concave part, and the other one of the second pre-installation part 111 and the first pre-installation part 101 includes a convex part, and in the case that the second pre-installation part 111 is matched with the first pre-installation part 101, at least a part of the convex part is in the concave part. In this case, the step of matching the second pre-installation part 111 with the first pre-installation part 101 to realize the pre-fixation of the diffusion pipe S includes: inserting at least a part of the convex part into the concave part to realize the pre-fixation of the diffusion pipe.

For example, in the embodiment illustrated in FIG. 3, the first pre-installation part 101 includes the concave part defined by the first baffle 104 and the first installation part 103, and the second pre-installation part 111 includes the convex part defined by the first convex part 113. In this case, the pre-assembly process includes: inserting at least a part of the second pre-installation part 111 (for example, the convex part defined by the first convex part 113) into the first pre-installation part (for example, the concave part defined by the first baffle 104 and the first installation part 103), so as to realize the plugging connection of the first pre-installation part 101 and the second pre-installation part 111, and further realize the pre-fixation of the diffusion pipe S.

For example, in the embodiment illustrated in FIG. 6, the first pre-installation part 101 includes the concave part defined by the groove 202 of the second installation part 201, and the second pre-installation part 111 includes the convex part defined by the second convex part 211. In this case, the pre-assembly process includes: inserting at least a part of the second pre-installation part 111 (for example, the second convex part 211) into the first pre-installation part (for example, the groove 202 of the second installation part 201), so as to realize the plugging connection of the first pre-installation part 101 and the second pre-installation part 111, and further realize the pre-fixation of the diffusion pipe S.

For example, in the embodiment illustrated in FIG. 7, the first pre-installation part 101 includes the convex part defined by the third installation part 301, and the second pre-installation part 111 includes the concave part defined by the third convex part 311. In this case, the pre-assembly process includes: inserting at least a part of the third installation part 301 into the concave part defined by the third convex part 311, so as to realize the plugging connection of the first pre-installation part 101 and the second pre-installation part 111, thereby realizing the pre-fixation of the diffusion pipe S.

For example, after the diffusion pipe S is fixed on the side wall 100A, the position of the fixation plate 10 or the position of the pressure plate 11 can be finely adjusted by the top thread, so that the position of the diffusion pipe S can be finely adjusted and the diffusion pipe can be connected accurately.

To sum up, by the installation method of the exhaust device provided by at least one embodiment of the present disclosure, the first pre-installation part of the fixation plate and the second pre-installation part of the pressure plate can realize pre-fixation of the diffusion pipe by matching with (cooperating with) each other, so that the initial alignment between the diffusion pipe and other components can be realized through the pre-fixation, and then the diffusion pipe can be fixed, and the position of the diffusion pipe can be finely adjusted through the top thread. This process can improve the assembly accuracy and assembly efficiency of the diffusion pipe, and save manpower and time.

Figure 9:
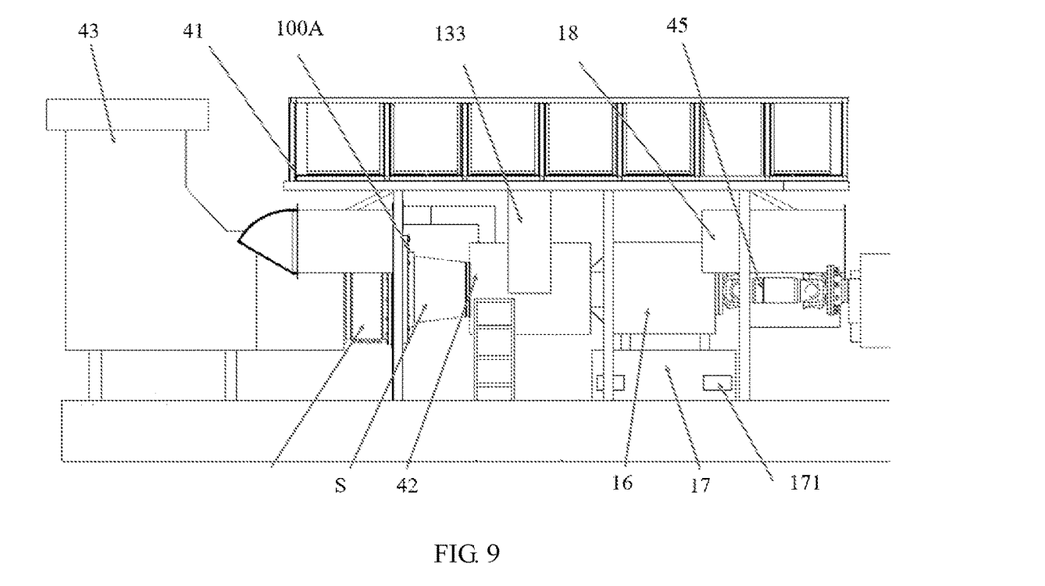
FIG. 9 is a schematic diagram of another turbine fracturing apparatus provided by at least one embodiment of the present disclosure.

FIG. 9 is a schematic diagram of another turbine fracturing apparatus provided by at least one embodiment of the present disclosure.

As illustrated in FIG. 9, the turbine fracturing apparatus includes: a silencer cabin 41, an air inlet assembly 18, a transmission mechanism 45 and the exhaust device according to any one of the above-mentioned embodiments. A turbine 42, a deceleration mechanism 16 and a deceleration mechanism base 17 are provided in the silencer cabin 41, the diffusion pipe S, the turbine 42, the deceleration mechanism 16 and the transmission mechanism 45 are sequentially connected along an axial direction of the diffusion pipe S, the deceleration mechanism base 17 is connected with the deceleration mechanism 16 and detachably fixed on a wall surface of the silencer cabin 41 close to the ground, the silencer cabin 41 includes the side wall 100A, the diffusion pipe S is stalled on the side wall 100A, and the air inlet assembly 18 and the diffusion pipe S are respectively on two side walls opposite to each other of the silencer cabin 41.

At least one embodiment of the present disclosure further provides a disassembly method of the turbine on the above-mentioned turbine fracturing apparatus, and the method includes: in the case that the air inlet assembly 18 does not need to be dismantled, disconnecting the connection between the deceleration mechanism 16 and the transmission mechanism 45, and disconnecting the connection between the diffusion pipe S and the turbine 42 and the connection between the diffusion pipe S and the side wall 100A; moving the diffusion pipe S away from the turbine 42 by a first distance, and moving a whole composed of the turbine 42, the deceleration mechanism 16 and the deceleration mechanism base 17 towards the diffusion pipe S by a second distance, so that the deceleration mechanism 16 avoids the air inlet assembly 18 in a direction perpendicular to the axial direction of the diffusion pipe, in which the first distance is greater than or equal to the second distance; and moving the whole composed of the turbine 42, the deceleration mechanism 16 and the deceleration mechanism base 17 out of the silencer cabin 41 along the direction perpendicular to the axial direction of the diffusion pipe S.

For example, the deceleration mechanism base 17 includes a forklift hole 171, the whole composed of the turbine 42, the deceleration mechanism 16 and the deceleration mechanism base 17 may be moved out of the silencer cabin 41 by adopting a forklift through the forklift hole 171.

The method further includes: in the case that the air inlet assembly needs to be dismantled, dismantling the air inlet assembly 18 from the silencer cabin 41; disconnecting the connection between the deceleration mechanism 16 and the transmission mechanism 45, and disconnecting the connection between the diffusion pipe S and the turbine 42 and the connection between the diffusion pipe S and the side wall 100A; and moving the whole composed of the turbine 42, the deceleration mechanism 16 and the deceleration mechanism base 17 out of the silencer cabin 41 along the direction perpendicular to the axial direction of the diffusion pipe S.

According to the disassembly method of the turbine provided by at least one embodiment of the disclosure, the turbine can be quickly disassembled, and reverse operation can be performed when the turbine is installed, so that the turbine can be quickly installed.

The following several statements should be noted:
(1) The accompanying drawings involve only the structure(s) in connection with the embodiment(s) of the present disclosure, and other structure(s) can be referred to common design(s).
(2) For clarity, in accompanying drawings for illustrating the embodiment(s) of the present disclosure, the thickness of a structure or a region may be enlarged or reduced, that is the drawings are not drawn in an actual scale.
(3) In case of no conflict, embodiments of the present disclosure and the features in the embodiments may be mutually combined to obtain new embodiments.

The above descriptions are only specific embodiments of the present disclosure, but the protection scope of the present disclosure is not limited thereto, the protection scope of the present disclosure should be determined by the protection scope of the claims

What is claimed is:
1. An exhaust device, comprising:
a body, comprising a side wall;
a fixation plate, configured to be fixed to the side wall;
a pressure plate, configured to be pre-fixedly connected and fixedly connected with the fixation plate; and
a diffusion pipe, configured to be fixed to the side wall through the pressure plate and the fixation plate,
wherein the fixation plate further comprises a first pre-installation part, and the pressure plate further comprises a second pre-installation part, and the second pre-installation part is matched with the first pre-installation part to realize a pre-fixation of the diffusion pipe.
2. The exhaust device according to claim 1, wherein:
the second pre-installation part and the first pre-installation part are configured to realize the pre-fixation of the diffusion pipe by plugging with each other;
one of the second pre-installation part and the first pre-installation part comprises a concave part, other one of the second pre-installation part and the first pre-installation part comprises a convex part; and
the second pre-installation part and the first pre-installation part are plugged with each other, at least a part of the convex part is in the concave part.
3. The exhaust device according to claim 2, wherein:
the side wall has an installation opening;
the fixation plate has a first opening configured for the diffusion pipe to pass through;
the pressure plate has a second opening configured for the diffusion pipe to pass through; and
the diffusion pipe is configured to pass through the installation opening, with the first opening and the second opening to be fixed on the side wall.
4. The exhaust device according to claim 3, wherein:
the fixation plate comprises a first plate surface;
the first pre-installation part comprises a first installation part protruding from the first plate surface in an axial direction;

the first installation part at least partially surrounds the first opening;

the first pre-installation part further comprises a first baffle protruding from a side of the first installation part to the first opening, and the side of the first installation part faces the first opening; and the first baffle is spaced apart from a first surface of the first installation part by a predetermined distance, and the first surface of the first installation part is spaced apart from the first plate surface in the axial direction, so that at least a part of the concave part is defined by the first baffle and the first installation part.

5. The exhaust device according to claim 4, wherein the first pre-installation part is matched with the second pre-installation part, and wherein the first surface of the first installation part faces at least a part of the pressure plate.

6. The exhaust device according to claim 4, wherein:
the pressure plate comprises a second plate surface, and the second pre-installation part comprises a first convex part protruding from the second plate surface in the axial direction, and the first convex part at least partially surrounds the second opening; and the first pre-installation part is matched with the second pre-installation part, a second surface of the first convex part faces a third surface of the first baffle, the second surface of the first convex part is spaced apart from the second plate surface in the axial direction, at least a part of the first convex part is in the first pre-installation part, and the third surface serves as at least part of a bottom surface of the concave part.

7. The exhaust device according to claim 6, further comprising: a first seal part between the first surface and the pressure plate and/or a second seal part between the second surface and the first baffle.

8. The exhaust device according to claim 4, wherein:
the first installation part has at least one threaded hole which extends in a direction parallel to the first plate surface and communicates with the first opening; and in a direction perpendicular to the first plate surface, the at least one threaded hole is between the first baffle and the first surface.

9. The exhaust device according to claim 3, wherein:
the fixation plate comprises a first plate surface, the first pre-installation part comprises a second installation part protruding from the first plate surface in an axial direction, and the second installation part at least partially surrounds the first opening; and a surface of the second installation part spaced apart from the first plate surface in the axial direction comprises a groove extending toward the first plate surface in a direction perpendicular to the first plate surface, and the groove is configured to accommodate at least a part of the convex part.

10. The exhaust device according to claim 9, wherein:
the pressure plate comprises a second plate surface;
the second pre-installation part comprises a second convex part protruding from the second plate surface in the axial direction;
the second convex part at least partially surrounds the second opening; and
the second convex part is configured to be insertable into the groove so that at least a part of the second convex part is in the groove of the second installation part.

11. The exhaust device according to claim 10, wherein a first side wall of the second installation part, away from the first opening in a radial direction, has at least one threaded hole which extends in a direction parallel to the second plate surface and penetrates through the first side wall.

12. The exhaust device according to claim 3, wherein:
the fixation plate comprises a first plate surface, the first pre-installation part comprises a third installation part protruding from the first plate surface in an axial direction, the third installation part at least partially surrounds the first opening, and the third installation part constitutes the convex part;

the pressure plate comprises a second plate surface, the second pre-installation part comprises a third convex part protruding from the second plate surface in the axial direction, the third convex part at least partially surrounds the second opening, and a part of the concave part is defined by the third convex part; and the first pre-installation part is matched with the second pre-installation part, and at least part of the third installation part is inserted into the second pre-installation part.

13. The exhaust device according to claim 12, wherein:
the third installation part is a first closed annular structure surrounding the first opening, and the third convex part is a second closed annular structure surrounding the second opening; and the first pre-installation part is matched with the second pre-installation part, the second closed annular structure is radially outward of the first closed annular structure and is radially outermost of the pressure plate, a side surface of the concave part is constituted by a radial inner surface of the third convex part, and a bottom surface of the concave part is the second plate surface.

14. The exhaust device according to claim 12, wherein the third convex part has at least one threaded hole which extends in a direction parallel to the second plate surface and penetrates through the third convex part.

15. A turbine fracturing apparatus, comprising:
a silencer cabin; and
the exhaust device according to claim 1,
wherein a turbine is provided in the silencer cabin, a silencer is provided outside the silencer cabin, the silencer cabin comprises a cabin has a side wall, the diffusion pipe is stalled on the cabin side wall, and two ends of the diffusion pipe are respectively connected with the turbine and the silencer.

16. An installation method of the exhaust device according to claim 1, comprising:
fixing the fixation plate to the side wall;
matching the second pre-installation part with the first pre-installation part to realize the pre-fixation of the diffusion pipe; and
fixedly connecting the pressure plate with the fixation plate to fix the diffusion pipe on the side wall.

17. The installation method according to claim 16, wherein:
the second pre-installation part and the first pre-installation part are configured to realize the pre-fixation of the diffusion pipe by plugging with each other, one of the second pre-installation part and the first pre-installation part comprises a concave part, other one of the second pre-installation part and the first pre-installation part comprises a convex part, and at least a part of the convex part is in the concave part; and
the installation method further comprises: inserting at least part of the convex part into the concave part to realize the pre-fixation of the diffusion pipe.

18. A disassembly method of a turbine fracturing apparatus, wherein:

the turbine fracturing apparatus comprises a silencer cabin, an air inlet assembly, a transmission mechanism and the exhaust device according to claim 1;

a turbine, a deceleration mechanism and a deceleration mechanism base are provided in the silencer cabin, the diffusion pipe, the turbine, the deceleration mechanism and the transmission mechanism are sequentially connected along an axial direction of the diffusion pipe, the deceleration mechanism base is connected with the deceleration mechanism and detachably fixed on a wall surface of the silencer cabin close to ground, the silencer cabin comprises the side wall, the diffusion pipe is on the side wall, and the air inlet assembly and the diffusion pipe are respectively on two side walls opposite to each other of the silencer cabin; and in a case that the air inlet assembly does not need to be dismantled, the disassembly method comprises:

disconnecting the deceleration mechanism from the transmission mechanism, and disconnecting the diffusion pipe from the turbine and the diffusion pipe from the side wall;

moving the diffusion pipe away from the turbine by a first distance, and moving a whole composed of the turbine, the deceleration mechanism and the deceleration mechanism base towards the diffusion pipe by a second distance, so that the deceleration mechanism avoids the air inlet assembly in a direction perpendicular to the axial direction of the diffusion pipe, wherein the first distance is greater than or equal to the second distance; and moving the whole composed of the turbine, the deceleration mechanism and the deceleration mechanism base out of the silencer cabin along the direction perpendicular to the axial direction of the diffusion pipe.

19. The disassembly method of the turbine fracturing apparatus according to claim 18, wherein, when the air inlet assembly needs to be dismantled, the disassembly method comprises:

dismantling the air inlet assembly from the silencer cabin;

disconnecting the deceleration mechanism from the transmission mechanism, and disconnecting the diffusion pipe from the turbine and the diffusion pipe from the side wall; and moving the whole composed of the turbine, the deceleration mechanism and the deceleration mechanism base out of the silencer cabin along the direction perpendicular to the axial direction of the diffusion pipe.

\* \* \* \* \*